United States Patent [19]
Beretta et al.

[11] Patent Number: 5,850,484
[45] Date of Patent: Dec. 15, 1998

[54] TEXT AND IMAGE SHARPENING OF JPEG COMPRESSED IMAGES IN THE FREQUENCY DOMAIN

[75] Inventors: Giordano Beretta, Palo Alto; Vasudev Bhaskaran, Mountain View; Konstantinos Konstantinides, San Jose, all of Calif.

[73] Assignee: Hewlett-Packard Co., Palo Alto, Calif.

[21] Appl. No.: 940,695

[22] Filed: Sep. 30, 1997

Related U.S. Application Data

[63] Continuation of Ser. No. 411,369, Mar. 27, 1995, abandoned.

[51] Int. Cl.$^6$ .................................................. G06K 9/36
[52] U.S. Cl. ........................ 382/250; 382/251; 382/239; 358/432; 348/404
[58] Field of Search .................................. 382/298, 233, 382/251, 244, 232, 253, 250, 274, 252, 238, 236, 166, 280, 270; 358/427, 426, 432, 261.3, 448, 261.1, 433, 261.2, 430, 458; 348/404, 432, 405, 433, 403, 391, 384, 422, 393, 430, 394, 409, 395, 390

[56] References Cited

U.S. PATENT DOCUMENTS

| | | | |
|---|---|---|---|
| 4,776,030 | 10/1988 | Tzou | 358/432 |
| 4,780,761 | 10/1988 | Daly et al. | 358/133 |
| 5,063,608 | 11/1991 | Siegel | 382/56 |
| 5,073,820 | 12/1991 | Nakagawa et al. | 358/133 |
| 5,333,212 | 7/1994 | Ligtenberg | 382/56 |
| 5,410,352 | 4/1995 | Watanabe | 348/405 |
| 5,465,164 | 11/1995 | Sugiura | 358/432 |
| 5,488,570 | 1/1996 | Agarwal | 364/514 R |

FOREIGN PATENT DOCUMENTS

| | | |
|---|---|---|
| 0444884A2 | 2/1991 | European Pat. Off. |
| 0513520A2 | 4/1992 | European Pat. Off. ....... H04N 7/133 |
| 0593159A2 | 9/1993 | European Pat. Off. ........ G06F 15/64 |
| 07087491 | 3/1995 | Japan ................................ H04N 7/30 |
| 07143343 | 6/1995 | Japan ................................ H04N 1/41 |

OTHER PUBLICATIONS

G. B. Beretta et al., "Experience with the New Color Facsimile Standard", ISCC Annual Meeting, Apr. 23–25, 1995, pp. 1–7.

Albert J. Ahumada, Jr. et al., "Luminance–Model–Based DCT Quantization for Color Image Comression", Human Vision, Visual Processing, and Digital Display III, 1666, 365–374, SPIE, 1992.

(List continued on next page.)

*Primary Examiner*—Jose L. Couso
*Assistant Examiner*—Matthew C. Bella

[57] ABSTRACT

The text and image enhancing technique according to the invention is integrated into the decoding or inverse quantization step that is necessarily required by the JPEG standard. The invention integrates the two by using two different quantization tables: a first quantization table ($Q_E$) for use in quantizing the image data during the compression step and a second quantization table used during the decode or inverse quantization during the decompression process. The second quantization table $Q_D$ is related to the first quantization table according to a predetermined function of the energy in a reference image and the energy in a scanned image. The energy of the reference image lost during the scanning process, as represented by the energy in the scanned image, is restored during the decompression process by appropriately scaling the second quantization table according to the predetermined function. The difference between the two tables, in particular the ratio of the two tables, determines the amount of image enhancing that is done in the two steps. By integrating the image enhancing and inverse quantization steps the method does not require any additional computations than already required for the compression and decompression processes.

35 Claims, 7 Drawing Sheets

OTHER PUBLICATIONS

Kenneth R. Alexander et al., "Spatial–Frequency Characteristics of Letters Identification", J. Opt. Soc. Am. A, 11,9, 2375–2382, 1994.

Wen–Hsiung Chen et al., "Adaptive Coding of Monochrome and Color Images", IEEE Transactions on Communications, COM–25, 1285–1292, 1977.

Bowonkoon Chitprasert et al., Human Visual Weighted Progressive Image Transmission, IEEE Transactions on Communications, COM–38, 7, 1040–1044, 1990.

R. J. Clarke, Spectral Responses of the Discrete Cosine and Walsh–Hadamard Transforms, IEE Proc., 130, Part F, 309–313, 1983.

K.K. De Valois et al., Color–Luminance Masking Interactions, Seeing Contour and Colour, J.J. Kulikowski, C.M. Dickinson and I.J. Murray Editors, Pergamon Press, Oxford, 1989.

J. Raymond Edinger, Jr., "A Measure for Stairstepping in Digitized Text that Correlates with the Subjective Impression of Quality", IS&T's Tenth International Congress on Advances in Non–Impact Printing Technologies, 552–558, 1994.

Yasushi Hoshino et al., Applicability of a Standardized Discrete Cosine Transform Coding Method to Character Images, J. Electronic Imaging, 1, 3, 322–327, 1992.

Chansik Hwang et al., Human Visual System Weighted Progresseive Image Transmission Using Lapped Orthogonal Transform/Classified Vector Quantization, Optical Engineering, 32, 7, 1524–1530, 1993.

International Organization for Standardization: Information Technology—Digital Compression and Coding of Continuous–Tone Still Images—Part 1: Requirements and Guidelines, ISO/IEC IS 10918–1, Oct. 20, 1992.

International Telecommunication Union: Amendments to ITU–T Rec. T.30 for Enabling Continuous–Tone Colour and Gray–Scale Modes for Group 3, COM 8–43–E, Question 5/8, Mar. 1994.

International Telecommunication Union: Amendments to ITU–T Rec. T–4 for Enabling Continuous–Time Colour and Gray–Scale Modes for Group 3, COM 8–44–E, Question 5/8, Mar. 1994.

Gordon E. Legge, "Reading: Effects of Contrast and Spatial Frequency", Applied Vision, OSA Technical Digest Series, 16, 90–93, 1989.

Gordon E. Legge et al., Contrast Masking in Human Vision, J. Opt. Soc. Am., 70,12,1458–1471, 1980.

David L. McLaren et al., "Removal of Subjective Redundancy from DCT–Coded Images", IEE Proceedings–I, 138, 5, 345–350, 1991.

I. Miyagawa et al., "Color–Facsimile System for Mixed–Color Documents", SID 94 Digest, 887–890, 1994.

Kathy T. Mullen, "The Contrast Sensitivity of Human Colour Vision to Red–Green and Blue–Yellow Chromatic Gratings", J. Physiol., 359, 381–400, 1985.

Daivd H. Parish et al., "Object Spatial Frequencies, Retinal Spatial Frequencies, Noise, and the Efficiency of Letter Discrimination", Vision Res., 31, 7/8, 1399–1415, 1991.

Denis G. Pelli et al., "Visual Factors in Letter Identification", IS&T's 47th Annual Conference/ICPS, p. 411, 1994.

Heidi A. Peterson et al., An Improved Detection Model for DCT Coefficient Quantization, Human Vision, Visual Processing, and Digital Display IV, 1913, 191–201, SPIE, 1993.

Ricardo L. de Queiroz et al., "Human Visual Sensitivity–Weighted Progressive Image Transmission Using the Lapped Orthogonal Transform", J. Electronic Imaging, 1, 3, 328–338, 1992.

Ricardo L. de Queiroz et al., Modulated Lapped Orthogonal Transforms in Image Coding, Digital Video Compression on Personal Computers: Algorithms and Technologies, 2187, 80–91, SPIE, 1993.

Robert J. Safranek et al., "A Perceptually Tuned Sub–Band Image Coder with Image Dependent Quantization and Post–Quantization Data Compression", Proc. ICASSP 89, 3, 1945–1948, 1989.

Robert J. Safranek, JPEG Compliant Encoder Utilizing Perceptually Based Quantization, Human Vision, Visual Processing, and Digital Display V, 1913, 117–126, SPIE, 1993.

Andrew B. Watson, DCT Quantization Matrices Visually Optimized for Individual Images, Human Vision, Visual Processing, and Digital Display IV, 1913, 202–216, SPIE, 1993.

Andrew B. Watson et al., Discrete Cosine Transform (DCT) Basis Function Visibility: Effects of Viewing Distance and Contrast Masking, Human Vision, Visual Processing, and Digital Display V, 2179, 99–108, SPIE, 1994.

TEXT AND IMAGE SHARPENING OF JPEG COMPRESSED IMAGES IN THE FREQUENCY DOMAIN

CROSS REFERENCE TO RELATED APPLICATION

This is a continuation of application Ser. No. 08/411,369 filed on Mar. 27, 1995, now abandoned.

RELATED APPLICATION DATA

This application incorporates subject matter disclosed in commonly-assigned application entitled METHOD FOR SELECTING JPEG QUANTIZATION TABLES FOR LOW BANDWIDTH APPLICATIONS, Ser. No. 08/935,517, filed on even date herewith.

BACKGROUND OF THE INVENTION

This invention relates to data compression using the JPEG compression standard for continuous-tone still images, both grayscale and color.

A committee known as "JPEG," which stands for "Joint Photographic Experts Group," has established a standard for compressing continuous-tone still images, both grayscale and color. This standard represents a compromise between reproducible image quality and compression rate. To achieve acceptable compression rates, which refers to the ratio of the uncompressed image to the compressed image, the JPEG standard adopted a lossy compression technique. The lossy compression technique was required given the inordinate amount of data needed to represent a color image, on the order of 10 megabytes for a 200 dots per inch (DPI) 8.5"×11" image. By carefully implementing the JPEG standard, however, the loss in the image can be confined to imperceptible areas of the image, which produces a perceptually loss less uncompressed image. The achievable compression rates using this technique are in the range of 10:1 to 50:1.

Figure 1:
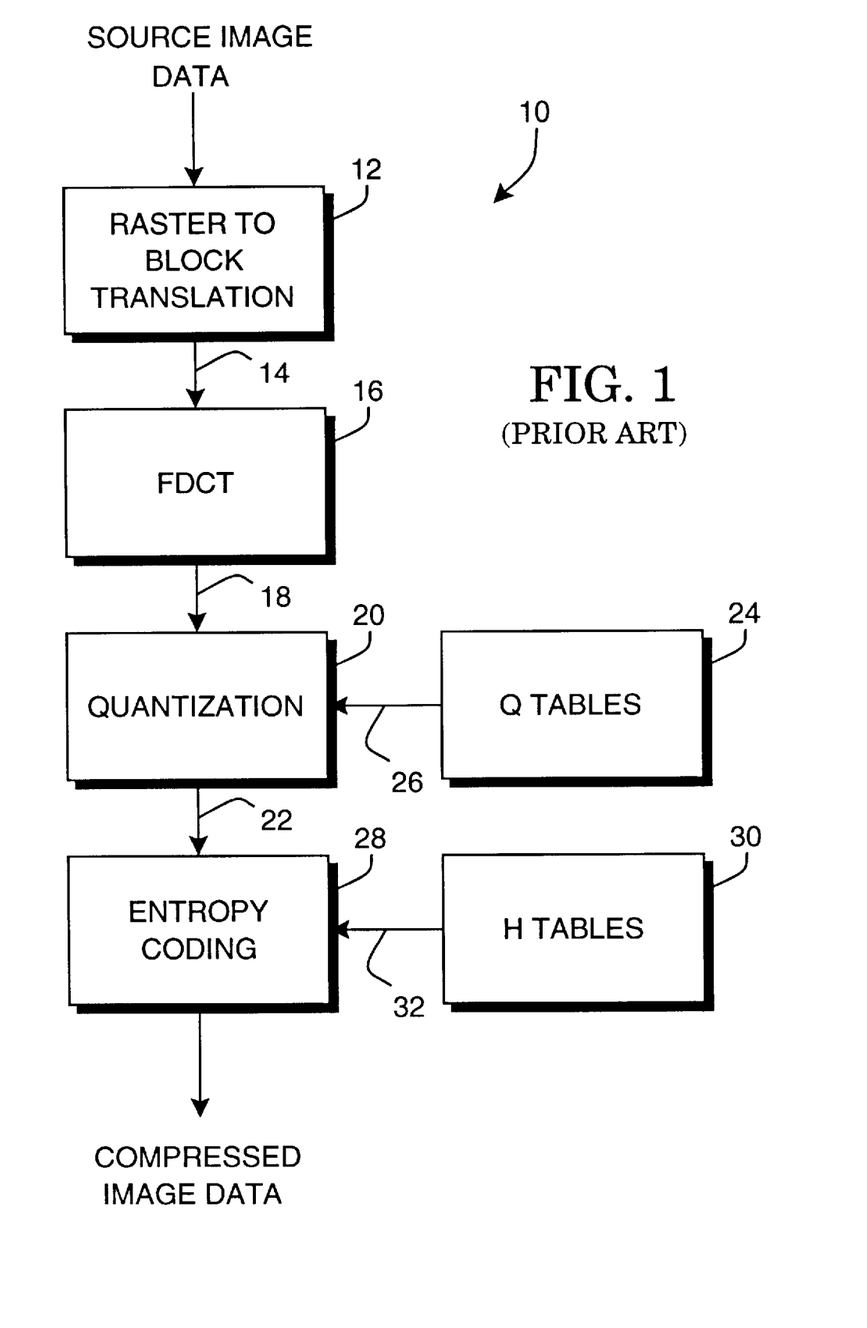
FIG. 1 is a block diagram of a prior art JPEG compression engine.

FIG. 1 shows a block diagram of a typical implementation of the JPEG compression standard. The block diagram will be referred to as a compression engine. The compression engine 10 operates on source image data, which represents a source image in a given color space such as CIELAB. The source image data has a certain resolution, which is determined by how the image was captured. Each individual datum of the source image data represents an image pixel. The pixel further has a depth which is determined by the number of bits used to represent the image pixel.

The source image data is typically formatted as a raster stream of data. The compression technique, however, requires the data to be represented in blocks. These blocks represent a two-dimensional portion of the source image data. The JPEG standard uses 8×8 blocks of data. Therefore, a raster-to-block translation unit 12 translates the raster source image data into 8×8 blocks of source image data. The source image data is also shifted from unsigned integers to signed integers to put them into the proper format for the next stage in the compression process. These 8×8 blocks are then forwarded to a discrete cosine transformer 16 via bus 14.

The discrete cosine transformer 16 converts the source image data into transformed image data using the discrete cosine transform (DCT). The DCT, as is known in the art of image processing, decomposes the 8×8 block of source image data into 64 DCT elements or coefficients, each of which corresponds to a respective DCT basis vector. These basis vectors are unique 2-dimensional (2D) "spatial waveforms," which are the fundamental units in the DCT space. These basis vectors can be intuitively thought to represent unique images, wherein any source image can be decomposed into a weighted sum of these unique images. The discrete cosine transformer uses the forward discrete cosine (FDCT) function as shown below, hence the name.

$$Y[k,l] = \frac{1}{4} C(k) \cdot C(l) \left[ \sum_{x=0}^{7} \sum_{y=0}^{7} S(x,y) \cdot \cos\frac{(2x+1)k\pi}{16} \cos\frac{(2y+1)l\pi}{16} \right]$$

where:
$C(k), C(l) = 1/\sqrt{2}$ for $k,l=0$; and
$C(k), C(l) = 1$ otherwise

The output of the transformer 16 is an 8×8 block of DCT elements or coefficients, corresponding to the DCT basis vectors. This block of transformed image data is then forwarded to a quantizer 20 over a bus 18. The quantizer 20 quantizes the 64 DCT elements using a 64-element quantization table 24, which must be specified as an input to the compression engine 10. Each element of the quantization table is an integer value from one to 255, which specifies the stepsize of the quantizer for the corresponding DCT coefficient. The purpose of quantization is to achieve the maximum amount of compression by representing DCT coefficients with no greater precision than is necessary to achieve the desired image quality. Quantization is a many-to-one mapping and, therefore, is fundamentally lossy. As mentioned above, quantization tables have been designed which limit the lossiness to imperceptible aspects of the image so that the reproduced image is not perceptually different from the source image.

The quantizer 20 performs a simple division operation between each DCT coefficient and the corresponding quantization table element. The lossiness occurs because the quantizer 20 disregards any fractional remainder. Thus, the quantization function can be represented as shown in Equation 2 below.

$$Y_Q[k,l] = \text{Integer Round}\left(\frac{Y[k,l]}{Q[k,l]}\right)$$

where $Y(k,l)$ represents the $(k,l)$-th DCT element and $Q(k,l)$ represents the corresponding quantization table element.

To reconstruct the source image, this step is reversed, with the quantization table element being multiplied by the corresponding quantized DCT coefficient. The inverse quantization step can be represented by the following expression:

$$Y[k,l] = Y_Q[k,l] \, Q_E[k,l]$$

As should be apparent, the fractional part discarded during the quantization step is not restored. Thus, this information is lost forever. Because of the potential impact on the image quality of the quantization step, considerable effort has gone into designing the quantization tables. These efforts are described further below following a discussion of the final step in the JPEG compression technique.

The final step of the JPEG standard is an entropy encoding, which is performed by an entropy encoder 28. The entropy encoder 28 is coupled to the quantizer 20 via a bus 22 for receiving the quantized image data therefrom. The entropy encoder achieves additional lossless compression by encoding the quantized DCT coefficients more compactly based on their statistical characteristics. The JPEG standard specifies two entropy coding methods: Huffman coding and arithmetic coding. The compression engine of FIG. 1 assumes Huffman coding is used. Huffman encoding, as is known in the art, uses one or more sets of Huffman code tables 30. These tables may be predefined or computed specifically for a given image. Huffman encoding is a well known encoding technique that produces high levels of lossless compression. Accordingly, the operation of the entropy encoder 28 is not further described.

Figure 2:
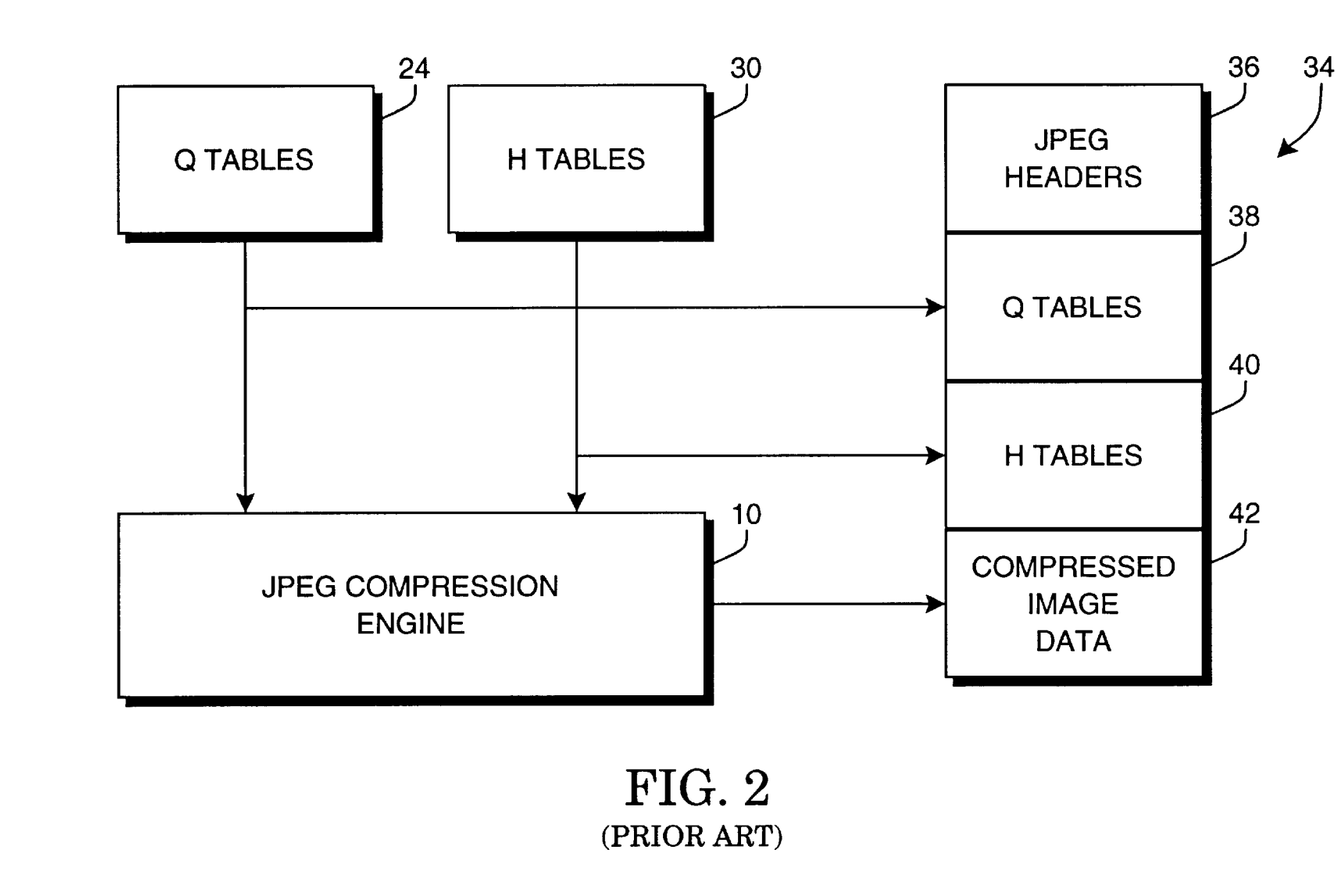
FIG. 2 is a drawing of a typical format of a JPEG compressed file.

Referring now to FIG. 2, a typical JPEG compressed file is shown generally at 34. The compressed file includes a JPEG header 36, the quantization (Q) tables 38 and the Huffman (H) tables 40 used in the compression process, and the compressed image data 42 itself. From this compressed file 34 a perceptually indistinguishable version of the original source image can be extracted when an appropriate Q-table is used. This extraction process is described below with reference to FIG. 3.

Figure 3:
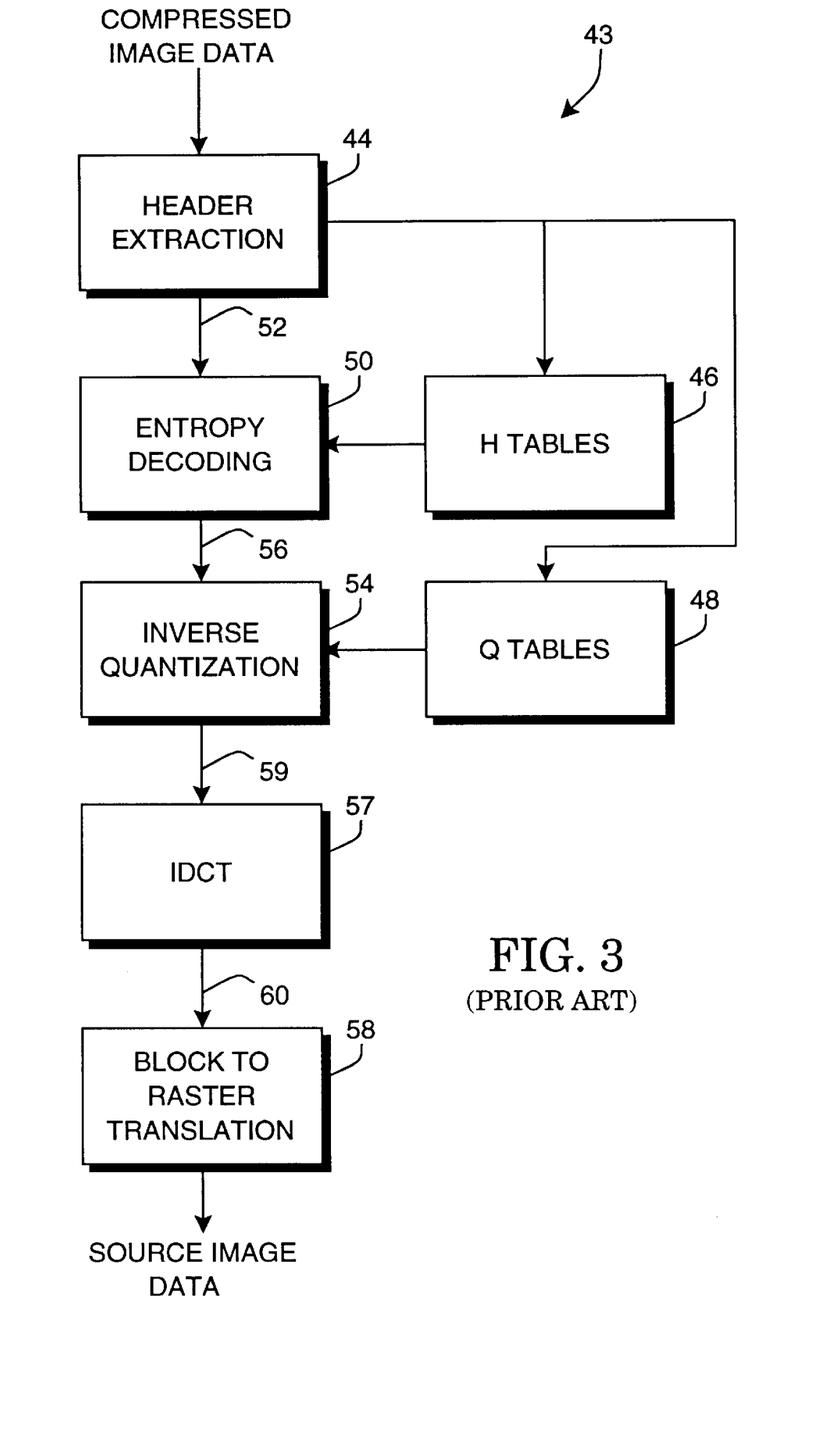
FIG. 3 is a block diagram of a prior art JPEG decompression engine.

A JPEG decompression engine 43 is shown in FIG. 3. The decompression engine essentially operates in reverse of the compression engine 10. The decompression engine receives the compressed image data at a header extraction unit 44, which extracts the H tables, Q tables, and compressed image data according to the information contained in the header. The H tables are then stored in H tables 46 while the Q tables are stored in Q tables 48. The compressed image data is then sent to an entropy decoder 50 over a bus 52. The Entropy Decoder decodes the Huffman encoded compressed image data using the H tables 46. The output of the entropy decoder 50 are the quantized DCT elements.

The quantized DCT elements are then transmitted to an inverse quantizer 54 over a bus 56. The inverse quantizer 54 multiplies the quantized DCT elements by the corresponding quantization table elements found in Q tables 48. As described above, this inverse quantization step does not yield the original source image data because the quantization step truncated or discarded the fractional remainder before transmission of the compressed image data.

The inverse quantized DCT elements are then passed to an inverse discrete cosine transformer (IDCT) 57 via bus 59, which transforms the data back into the time domain using the inverse discrete cosine transform (IDCT). The inverse transformed data is then transferred to block-to-raster translator 58 over a bus 60 where the blocks of DCT elements are translated into a raster string of decompressed source image data. From the decompressed source image data, a facsimile of the original source image can be reconstructed The reconstructed source image, however, is not an exact replication of the original source image. As described above, the quantization step produces some lossiness in the process of compressing the data. By carefully designing the quantization tables, however, the prior art methods have constrained the loss to visually imperceptible portions of the image. These methods, and their shortcomings, are described below.

The JPEG standard includes two examples of quantization tables, one for luminance channels and one for chrominance channels. See International Organization for Standardization: "Information technology—digital compression encoding of continuous-tones still images—part 1: Requirements and Guidelines," ISO/IEC IS10918-1, Oct. 20, 1992. These tables are known as the K.1 and K.2 tables, respectively. These tables have been designed based on the perceptually lossless compression of color images represented in the YUV color space.

These tables result in visually pleasing images, but yield a rather low compression ratio for certain applications. The compression ratio can be varied by setting a so-called Q-factor or scaling factor, which is essentially a uniform multiplicative parameter that is applied to each of the elements in the quantization tables. The larger the Q-factor the larger the achievable compression rate. Even if the original tables are carefully designed to be perceptually lossless, however, a large Q-factor will introduce artifacts in the reconstructed image, such as blockiness in areas of constant color or ringing in text-scale characters. Some of these artifacts can be effectively cancelled by post-processing of the reconstructed image by passing it through a tone reproduction curve correction stage, or by segmenting the image and processing the text separately. However, such methods easily introduce new artifacts. Therefore, these methods are not ideal.

As a result of the inadequacy of the Q-factor approach, additional design methods for JPEG discrete quantization tables have been proposed. These methods can be categorized as either perceptual, which means based on the human visual system (HVS) or based on information theory criteria. These methods are also designated as being based on the removal of subjective or statistical redundancy, respectively. These methods are discussed in copending application entitled "Method for Selecting JPEG Quantization Tables for Low Bandwidth Applications," commonly assigned to the present assignee, incorporated herein by reference.

Quantization is not the only cause of image degradation. The color source image data itself might be compromised. For scanned colored images, the visual quality of the image can be degraded because of the inherent limitations of color scanners. These limitations are mainly of two kinds: limited modulation transfer function (MTF) and misregistration. The modulation transfer function refers to the mathematical representation or transfer function of the scanning process. There are inherent limitations in representing the scanning process by the MTF and these limitations are the main cause of pixel aliasing, which produces fuzzy black text glyphs of grayish appearance. Misregistration, on the other hand, refers to the relative misalignment of the scanner sensors for the various frequency bands. For example, the Hewlett Packard Scan Jet IIc™ has a color misregistration tolerance of +/−0.076 mm for red and blue with respect to green. This amount of misregistration is significant considering the size of an image pixel (e.g., 0.08 mm at 300 dots per inch (dpi)).

These limitations significantly degrade text in color images because sharp edges are very important for reading efficiency. The visual quality of text can be improved, however, using prior art edge enhancement techniques. Edge enhancement can be performed in either the spatial or frequency domain. In the spatial domain (i.e., RGB), edge crispening can be performed by discrete convolution of the scanned image with an edge enhancement kernel. This approach is equivalent to filtering the image with a high-pass filter. However, this technique is computationally intensive. An M×N convolution kernel, for example, requires MN multiplications and additions per pixel.

For edge sharpening in the frequency domain, the full image is first transformed into the frequency domain using the Fast Fourier Transform (FFT) or the Discrete Fourier Transform (DFT), low frequency components are dropped, and then the image is transformed back into the time domain. This frequency domain method, as with the spatial domain method, is also computationally intensive. Moreover, it uses a transformation different than that required by the JPEG standard.

Accordingly, the need remains for a computationally efficient method for improving the visual quality of images, and in particular text, in scanned images.

SUMMARY OF THE INVENTION

The invention is a method of compressing and decompressing images which comprises using one quantization table ($Q_E$) for compressing the image and a second quantization table ($Q_D$) for decompressing the image. In general, compression and decompression are performed in conformance with the JPEG standard. The second quantization table $Q_D$ is related to the first quantization table according to the following general expression:

$$Q_D = S \times Q_E + B,$$

where S is a scaling matrix having each element $S[k,l]$ formed according to the following expression:

$$S[k,l]^2 = V^*[k,l]/V_Y[k,l]$$

where $V^*$ is a variance matrix of a reference image and $V_Y$ is a variance matrix of a scanned image; and where B is a brightness matrix, which can include zero or non-zero elements. By using the scaling matrix S, the high-frequency components of the DCT elements can be "enhanced" without any additional computational requirements. According to the invention, the quantization table $Q_D$ is transmitted with the encoded quantized image data, and is used in decompression to recover the image.

The reference image is a preselected continuous-tone image, either grayscale or color depending on the images to be processed. The reference image is rendered into a target image file. The target image file is not generated by a scanner, so the data therein is not compromised by any of the inherent limitations of a color scanner. Thus, the variance of the target image data, which is a statistical representation of the energy or frequency content of the image, retains the high-frequency components. The reference image can be any continuous-tone image, but in the preferred embodiment the reference image includes text with a serif font because the serif font has good visual quality which the method preserves.

The scanned image, although it can be any image, in the preferred embodiment is a printed version of the reference image. Thus, the variance of the scanned image represents the energy or frequency composition of the reference image but which is compromised by the inherent limitations of the scanner. The scaling matrix, therefore, boosts the frequency components that are compromised by the scanning process.

A preferred embodiment of the invention is described herein in the context of a color facsimile (fax) machine. The color fax machine includes a scanner for rendering a color image into color source image data that represents the color image, a compression engine that compresses the color source image data to compressed image data, a means for encapsulating the compressed image data, and a means for transmitting the encapsulated data. The compression engine includes means for storing two quantization tables. The first quantization table is used to quantize the image data transformed using the discrete cosine transform (DCT). The second quantization table is encapsulated with the encoded quantized image data for use in decompressing the image. The second quantization table is related to the first quantization table in the manner described above. When used to transmit and receive color images between two locations, the machine transfers the images with higher quality than prior systems.

The second quantization table can be precomputed and stored in the compression engine, in which case there are no additional computational requirements for the compression engine to implement the image enhancing method of the invention. This capability results in a lower cost color facsimile product than is possible using the prior art image enhancement techniques.

The foregoing and other objects, features and advantages of the invention will become more readily apparent from the following detailed description of a preferred embodiment of the invention which proceeds with reference to the accompanying drawings.

DETAILED DESCRIPTION OF THE PREFERRED EMBODIMENT

Overview of the Quantization Process

The text and image enhancing technique according to the invention is integrated into the decoding or inverse quantization step that is necessarily required by the JPEG standard. The invention integrates the two by using two different quantization tables: a first quantization table ($Q_E$) for use in quantizing the image data during the compression step and a second quantization table ($Q_D$) for use during the decode or inverse quantization during the decompression process. The difference between the two tables, in particular the ratio of the two tables, determines the amount of image enhancing that is done in the two steps. By integrating the image enhancing and inverse quantization steps, the method does not require any additional computations than already required for the compression and decompression processes.

In order to understand the operation of the invention, the following mathematical derivation is necessary. Let $Q_D$ be the second quantization table used during the decoding or inverse quantization step. Then let $Q_D$ be related to the first quantization table $Q_E$, used during the quantization step, by the following expression:

$$Q_D = (S \times Q_E) + B \tag{1}$$

where S is a scaling matrix, which scales each element of the first quantization table $Q_E$ to a corresponding element in the second quantization table $Q_D$. The scaling matrix S is not used in a true matrix multiplication; rather, the multiplication is an element-by-element multiplication. Each element in the first quantization table $Q_E$ has a corresponding element in the scaling matrix S that when multiplied together produce the corresponding element in the second quantization table $Q_D$.

The matrix B is a so-called brightness matrix because it can affect the brightness of the image by changing the DC level of the DCT elements. The elements of the B matrix can include zero or non-zero values depending on the desired brightness. For purposes of the following discussion and derivation, however, it will be assumed that the B matrix contains zero elements only to simplify the derivation.

The text and image enhancing technique of the invention uses a variance matrix to represent the statistical properties of an image. The variance matrix is an M×M matrix, where each element in the variance matrix is equal to the variance of a corresponding DCT coefficient over the entire image. The variance is computed in the traditional manner, as is known in the art.

The edge enhancement technique in essence tries to match the variance matrix of a decompressed image ($V_{Y'}[k,l]$) with a variance matrix of a reference image ($V^*[k,l]$). The technique tries to match the two by scaling the quantization table in the manner described above. In order to do this, the method takes advantage of the relationship between the uncompressed image and the compressed image. The following derivation will make this relationship clear.

Let $V^*[k,l]$ denote the variance of the [k,l] frequency component of a reference image. Ideally, this image contains those critical attributes that the technique seeks to preserve, for example, text. This variance matrix is of an ideal or reference image in that it is not rendered into color source image data by a scanner but, instead, is rendered into its ideal form by software, described further below. Thus, the color source image data of the reference image does not suffer from the image degradation due to the inherent limitations of the scanner. Therefore, the variance of the reference image retains the high-frequency characteristics of the original reference image.

The method produces a resulting decompressed image that has approximately the same variance as the variance of the reference by modifying the quantization table. Thus, the method produces the following relationship:

$$V_{Y'}[k,l] = V^*[k,l] \quad (2)$$

However, the decompressed image (Y') is related to the original quantized image ($Y_Q$) by the following expression:

$$Y'[k,l] = Y_{QE}[k,l] \, Q_D[k,l] \quad (3)$$

Substituting equation (1) into equation (3) yields the following equation below:

$$Y'[k,l] = Y_{QE}[k,l] \, (S[k,l] \, Q_E[k,l]) \quad (4)$$

The variance of the decompressed image ($V_{Y'}$) can then be expressed by the following expression:

$$V_{Y'}[k,l] = Var(Y'[k,l]) = Var(S[k,l] \, Y_{QE}[k,l] \, Q_E[k,l]) \quad (5)$$

Reducing this expression yields the following:

$$V_{Y'}[k,l] = S^2[k,l] \, V_Y[k,l] \quad (6)$$

where $V_Y$ represents the variance of the original uncompressed image.

Substituting equation (6) into equation (2) yields the following relationship between the scaling matrix S and the variances of the reference image ($V^*$) and the original image ($V_Y$):

$$S[k,l]^2 = V^*[k,l]/V_Y[k,l]. \quad (7)$$

Therefore, the scaling matrix S can be used to boost the variance of the JPEG compressed image to that of the reference image by appropriate formation of the scaling matrix. This method is shown in a more generalized fashion in FIG. 4.

Preferred Embodiment of the Method

Figure 4:
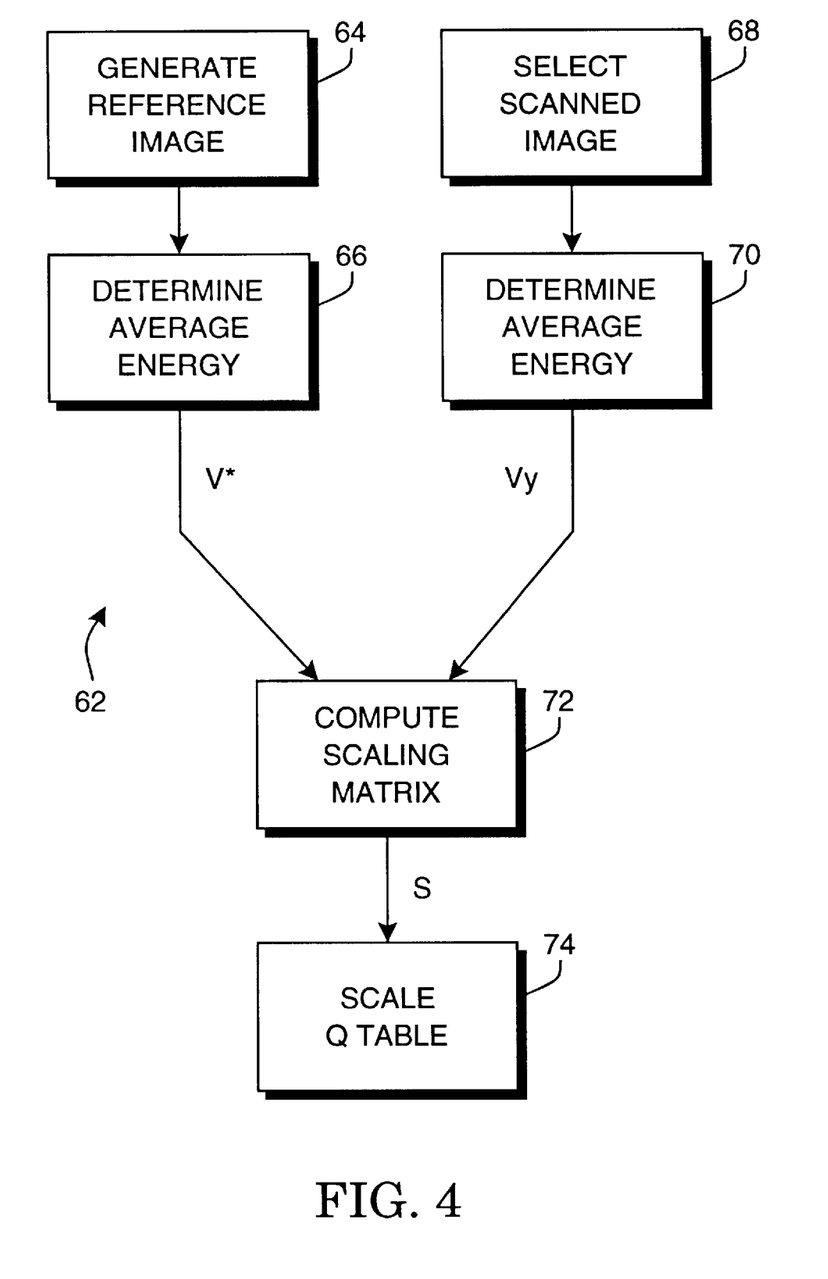
FIG. 4 is a flow chart of a method of forming a scaled quantization table according to the invention.

In FIG. 4, a method 62 of forming a scaled quantization table according to the invention is shown. The first step 64 is to generate a reference image. This reference image, in the preferred embodiment, embodies certain valued features or elements that the method seeks to preserve. In the preferred embodiment, these critical elements include highly readable text such as those typefaces having a serif font, e.g., Times Roman. The selection of the reference image is important because it is the frequency or energy characteristics of this image that the text image sharpening method is intended to preserve. Because the method is statistical, the result can be improved by averaging over a number of typical images. Examples of such typical images are those using different fonts (e.g., Palatino and Devanagari), handwriting, shorthand, line drawings, schematics, bar codes, etc. These different images can further be categorized in a number of classes.

This generating step 64 is performed on a computer, typically using a word processor or desktop publishing application such as Adobe Illustrator or Microsoft Word. The image is entered into the computer and then rendered by the application into reference image data by the application. The reference image data will be in the appropriate color space, e.g., CIELAB or RGB, to allow the subsequent step to be performed. This process can be achieved by first rendering the image into an Adobe Postscript file and then rendered into a bit-mapped color source image data file using DisplayPostscript. Alternatively, other page description languages can be used to describe the image such as the PCL language by Hewlett Packard and then rendered into a bit map by an appropriate rendering program.

Once the reference image is generated and rendered into reference image data, the average energy of the reference image is determined in step 66. In the preferred embodiment, this step includes computing the variance matrix ($V^*$) for the reference image data. The variance matrix, as is known in the art, statistically represents the frequency components or energy contained in the image. Unlike a scanned image, the reference image does not suffer from any of the inherent limitations of the color scanner because it is not compromised by the misregistration and MTF limitations of the scanner. Accordingly, the variance for the reference image retains the high-frequency energy that is critical to the visual quality of the reference image.

In step 68, a scanned image is scanned or selected from one or more stored pre-scanned images. This scanned image is one that suffers from the inherent limitation of the scanner. This scanned image can be any image, but in the preferred embodiment it is a scanned version of the reference image generated in step 64, or of the same type of image used to form an averaged reference image.

As in step 66, the average energy of the scanned image is then determined in step 70. The average energy again is represented by a variance matrix ($V_Y$) of the scanned image.

The variance matrix ($V^*$) of the reference image and the variance matrix ($V_Y$) of the scanned image are then used to compute the scaling matrix S in step 72. This step involves solving equation (7) above for each element in the scaling matrix S.

Finally, in step 74 the scaled version of the quantization table is calculated. This step is a simple element-by-element multiplication as represented by equation (1) above.

Figure 5:
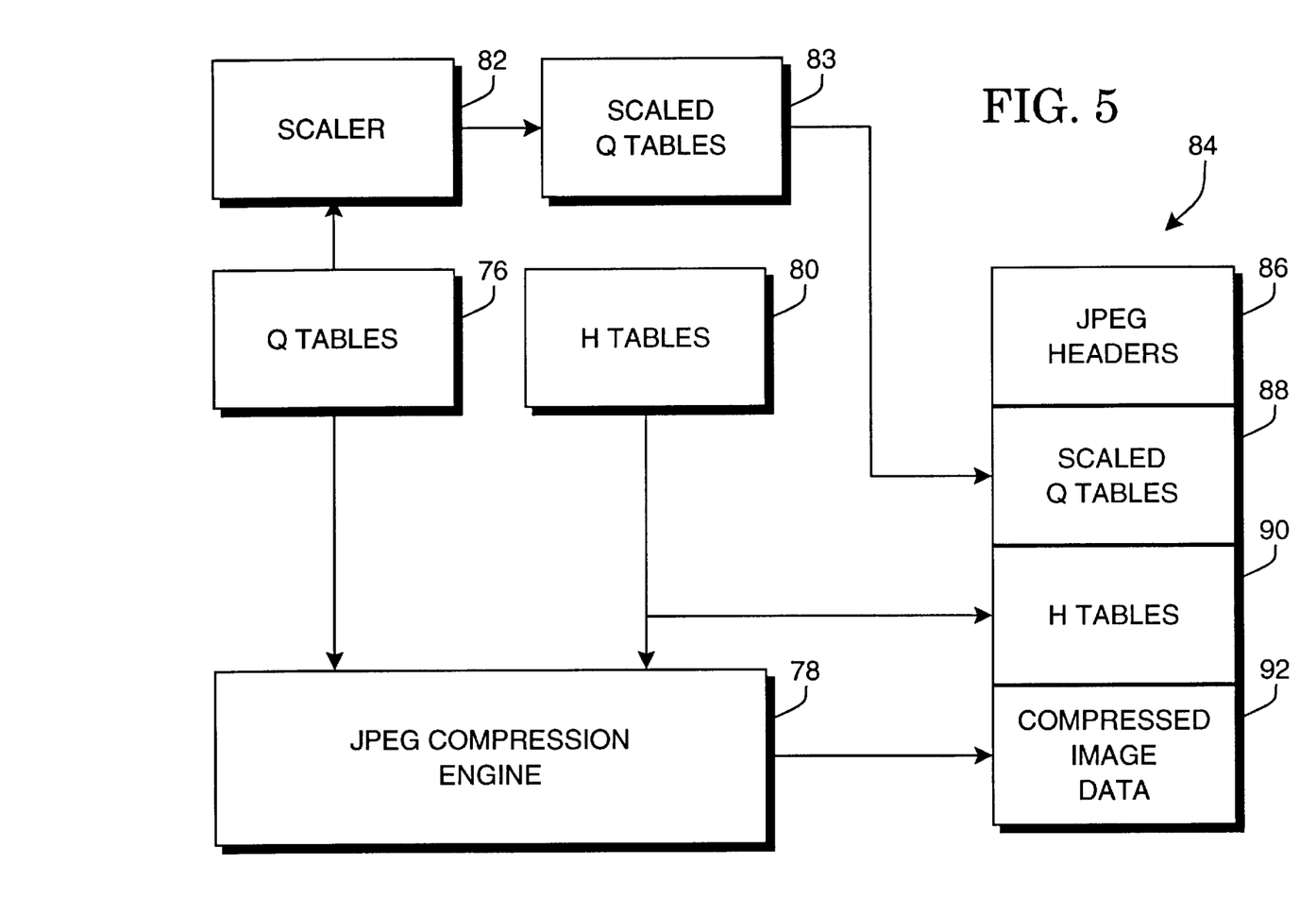
FIG. 5 is a drawing of a JPEG compressed file including a quantization table scaled according to the invention.

The use of the scale tables is seen clearly with reference to FIG. 5. In FIG. 5, a first set of Q tables 76 is provided to a JPEG compression engine 78, which compresses the image data in accordance with the JPEG compression standard. The compression engine 78 performs the quantization step using the Q tables 76. The compression engine 78 also performs the entropy encoding, as described above, using Huffman tables 80.

The Q tables 76 are then scaled by a scaler 82 using the method 62 described above with reference to FIG. 4. A JPEG format file 84 is then formed which includes a JPEG header 86, the scaled Q tables 88, the H tables 90 and the compressed image data 92. Thus, although the quantization was performed using the Q tables 76, the scaled Q tables are transmitted for use in the decompression process. This difference between the two quantization tables, as represented by the scaling matrix, is what implements the text and image enhancing technique according to the invention. An advantage of the present invention is that no changes necessarily need to be made to the decompression engine to implement the image enhancing technique of the invention. The decompression engine uses the scaled Q tables in the same way it would use unscaled Q tables. Thus, the prior art decompression engine of FIG. 3 can still decompress images compressed according to the invention. Moreover, it can do so with the improved image quality provided by the invention. In addition, the scaled Q-tables can be precomputed and stored in memory so that the scaling step does not need to be performed real-time. This preferred embodiment of the invention, therefore, does not require scaler 82.

Figure 6:
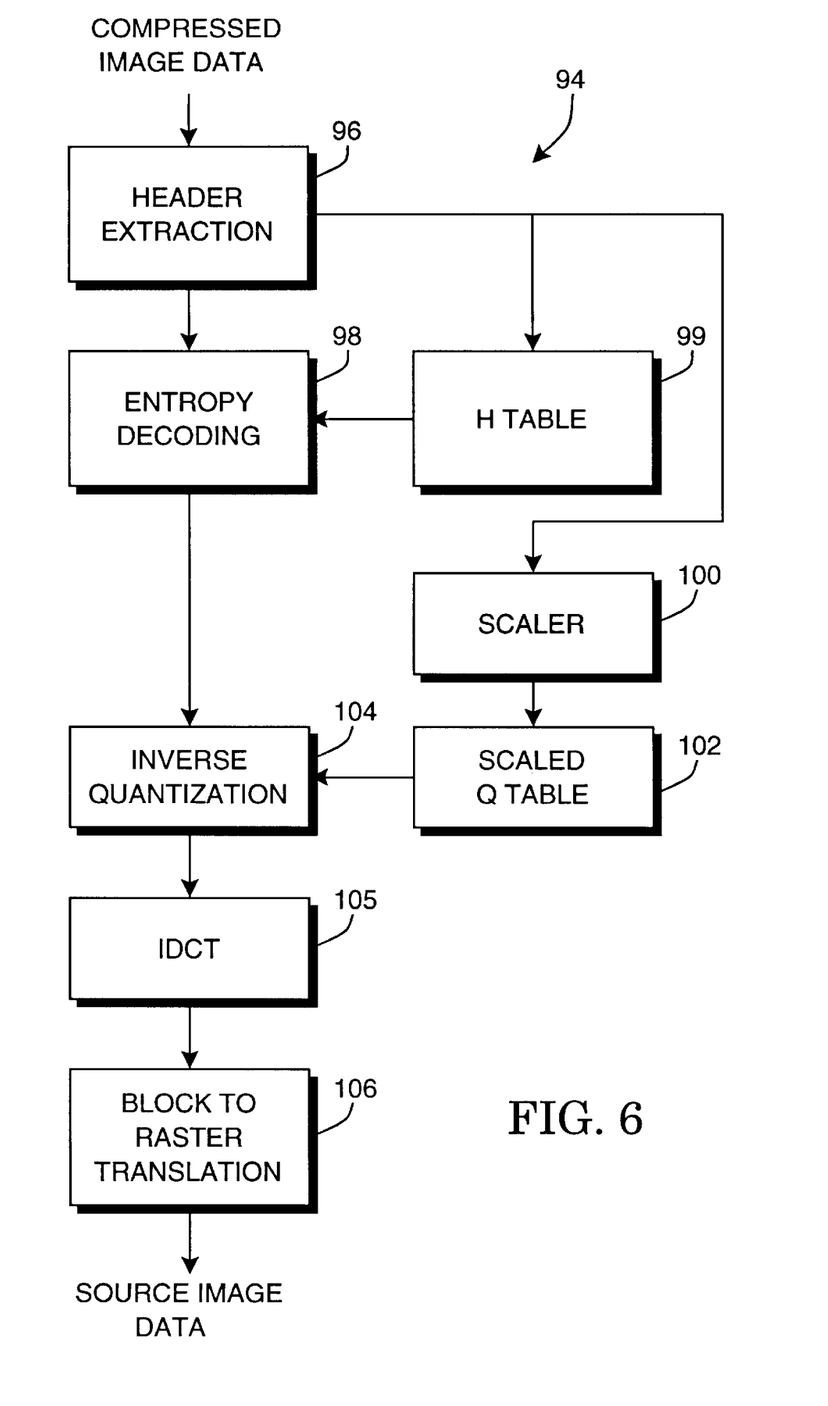
FIG. 6 is a block diagram of a JPEG decompression engine according to the invention.

Alternatively, the scaling can be performed on the decompression side rather than on the compression side. A decompression engine 94 which implements the text and image enhancing technique according to this aspect of the invention is shown in FIG. 6. Decompression engine 94 could be used in conjunction with a prior art compression engine which does not implement the text and image enhancing technique according to the invention.

The decompression engine 94 includes a header extraction unit 96, which extracts the H tables and the Q tables. The H tables are used by an entropy decoder 98 to decode the compressed image data. The Q tables received by the decompression engine are then scaled by a scaler 100, which scales the Q tables according to equation 7 above. The variance matrices (V* and $V_y$) are stored in the scaler for use in the scaling process. The scaled Q tables are then stored in a random access memory 102 for use by an inverse quantizer 104, which performs the inverse quantization step. Because the scaled Q tables are used in the inverse quantization step the text and image enhancing technique according to the invention is implemented in this step. The inverse quantized image data is then transformed by IDCT 105 and rasterized by a block-to-raster translator 106. The result is text and image enhanced source image data.

Thus, the text and image enhancing technique can either be implemented in either the decompression side or the compression side, but not both. If the decompression engine 94 and compression engine 78 are used together, there must be some way to bypass the scaler 100 where the scaling is performed on the compression side. It is possible for the JPEG header to include a tag field to indicate whether or not the scaling has been performed in the compression or, alternatively, whether it needs to be performed in the decompression. However, this would require the use of a JPEG application marker in the JPEG file. Accordingly, the preferred method is to scale the quantization tables on the compression side and transmit the scaled quantization tables to the decompression engine. This would not necessitate any changes to the decompression engine or the JPEG standard.

Although the compression engine according to the invention is implemented in dedicated hardware as described hereinabove, alternatively it can be implemented in software operating on a programmed computer having a microprocessor such as an Intel 80486 or Pentium or Hewlett Packard PA-RISC. In the latter case, the various tables, whether precomputed or computed real-time, are stored in the dynamic random access memory (DRAM) of the computer during the compression and decompression processes and the various steps of the method are implemented by software processes or routines. In addition, there a numerous combinations of hardware and/or software that can be used to implement compression and/or decompression engines according to the invention depending on the desired performance and cost. The combinations are too numerous to describe individually but those skilled in the art could implement such combinations based on the description found herein.

Preferred Embodiment of the Apparatus

Figure 7:
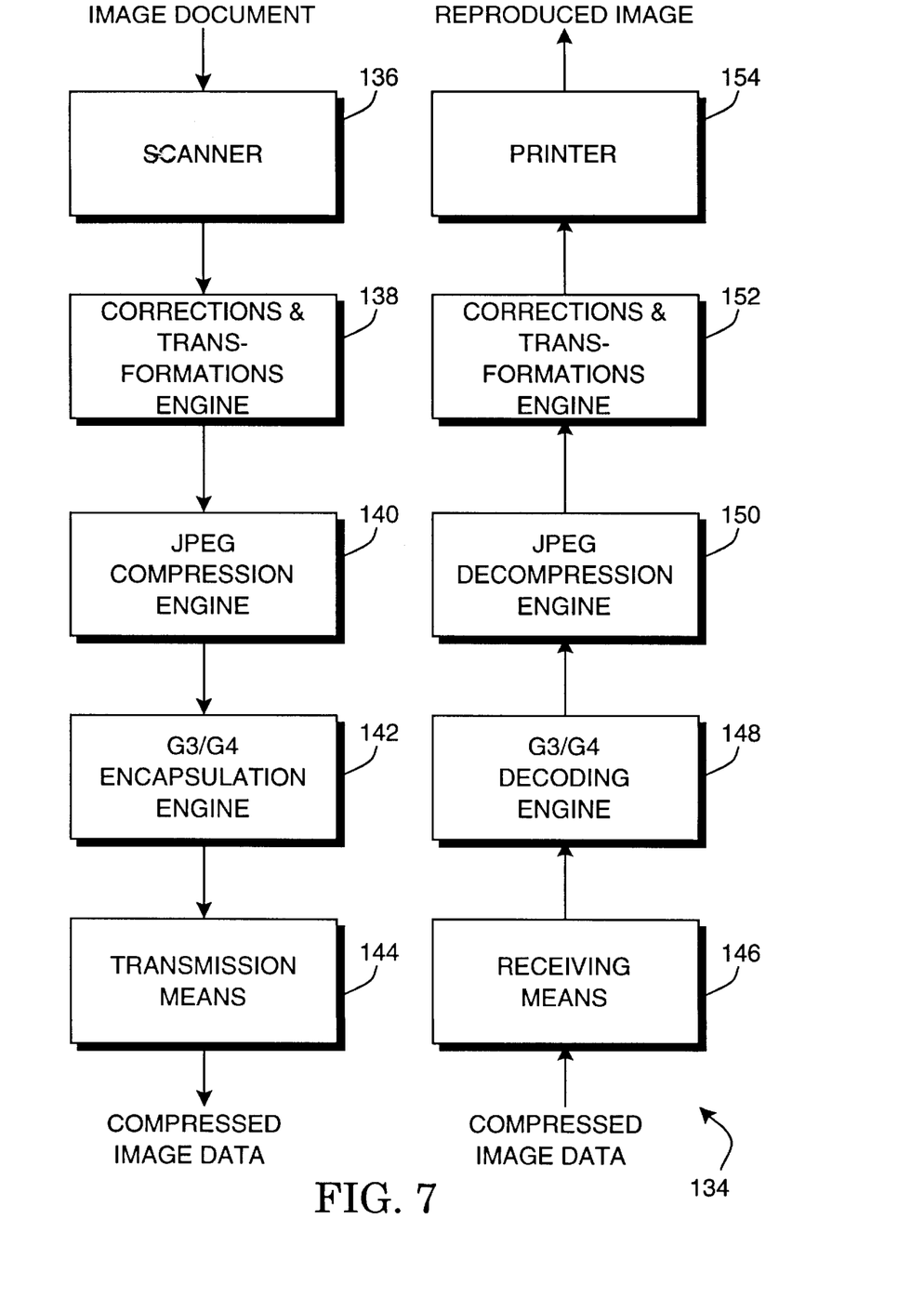
FIG. 7 is a block diagram of a color fax machine including JPEG compression and decompression engines according to the invention.

A color facsimile machine 134 using the JPEG compression and decompression engines according to invention is shown in FIG. 7. The color fax machine 134 includes two related but independent components: a send component and a receive component. The send component includes a scanner 136 which receives a physical image document and which renders or transforms the physical image into color source image data. The color source image data is then passed to a corrections and transformation engine 138, which can correct for certain anomalies in the scanner and format the source color image data appropriately. This transformation can include transforming the color source image data from one color space, e.g., RGB, to another, e.g., CIELAB.

The corrected and transformed color source image data is then passed to a JPEG compression engine 140, which includes the two quantization tables ($Q_E$, $Q_D$) formed in accordance with the invention described herein. The first quantization table $Q_E$, in the preferred embodiment of the invention is formed in accordance with the method taught in our commonly-assigned application entitled METHOD FOR SELECTING JPEG QUANTIZATION TABLES FOR LOW BANDWIDTH APPLICATIONS, Ser. No. 8/935,517, incorporated herein by reference. Alternatively, any customary JPEG quantization tables (e.g., K.1) can be used as the first quantization tables.

The JPEG compression engine compresses the source image data into compressed image data in the manner described above, which is then passed onto a G3/G4 encapsulation engine 142 along with the second Q-table ($Q_D$). The encapsulation engine 142 performs the step of encapsulating the compressed image data in accordance with the amended T.30 Group 3 Facsimile Standard. Alternatively, instead of G3, the encapsulation could also be G4 for an equivalent machine operating according to the T.30 Group 4 Facsimile Standard. The encapsulated data is then transmitted via a transmission means 144 over the limited bandwidth channel. In the preferred embodiments, this transmission means includes a modem (modulator), but can also include direct transmission circuitry.

On the receiving end, the color fax machine 134 includes a receiving means 146, which in the preferred embodiment uses a modem (demodulator) of the transmission means 144 or equivalent digital receive circuitry. The received compressed image data is then decoded by a G3/G4 decoding engine 148. The engine 148 decodes or unencapsulates the compressed image in accordance with the applicable Group 3 or Group 4 facsimile standard. The decoded compressed image data is then decompressed by a JPEG decompression engine 150. In the preferred embodiment, this decompression engine is that shown in FIG. 6, which includes the Q-table scaler. Moreover, the decompression engine 150 includes means for determining whether the Q-tables were scaled in the compression process. As described above, this operation involves decoding the header file. Alternatively, a precomputed set of scaled Q-tables cold be stored in memory in the receive component and used in the decompression process by the engine 150. In a further embodiment, the engine 150 could assume that the scaling was performed in the compression process and simply use the Q-tables as received.

The decompressed source image data is then passed to a corrections and transformations engine 152, which transforms the source image data into the color space required by a color printer 154 included in the color fax 134. The color printer 154, which can use any printing technology such as electro-photographic, inkjet or impact, then reproduces the image. The reproduced color image, by using the scaled Q-tables formed in accordance with the invention, improves the text and image quality of the image without requiring real-time processing of the image data. The text and image enhancing techniques described herein take advantage of the processing already required by the JPEG standard to implement the techniques. Thus, the overall cost of the product is not impacted.

The color facsimile machine 134 can include a plurality of different scaled quantization tables for use during the compression and/or decompression process. These different scaled quantization tables can be precomputed, using the method described above, wherein each table is formed using a different reference image or an average of several images of a given type. These different reference images can be selected to enhance different textual or image characteristics. The user can then select the particular scaled quantization table that matches his or her image so that the image enhancement technique can optimize for the user's image. In the preferred embodiment, the machine 134 includes a user actuable selection device to indicate the user's selection. The send component of fax machine 134 would then select the appropriate scaled quantization table responsive to the user's selection.

The same method can be applied to a grayscale facsimile machine or when a color facsimile machine is used in grayscale mode. In this case only the luminance channel is used. As a result, when the term color is used herein it refers to both color and grayscale.

The color facsimile machine 134 is but one example of an application for the JPEG compression and decompression engines of the invention. The quantization tables formed by the above described method can be used in any context that requires JPEG compression. These applications are typically those that have limited bandwidth capability. An example of another such limited bandwidth application is a personal computer or work station. In these applications color images are displayed on the screen, which can be represented in a variety of different formats such as Postscript. JPEG compression can be used to compress these color images to allow for more efficient transmission of the compressed image over the limited bandwidth channel.

Having illustrated and described the principles of our invention in a preferred embodiment thereof, it should be readily apparent to those skilled in the art that the invention can be modified in arrangement and detail without departing from such principles. For example, although the invention has been described in reference to the JPEG compression standard, the method is applicable to MPEG, H.261 or other compression standards as well. We claim all modifications coming within the spirit and scope of the accompanying claims.

We claim:

1. A machine for transmitting color images comprising:
    means for rendering a color image into color source image data representing the color image;
    a compression engine that compresses the source image data into compressed image data, the engine including:
        a transforming means for converting the source image data into transformed image data,
        means for storing a first multi-element quantization table ($Q_E$);
        a quantizer means for converting the transformed image data into quantized image data in accordance with elements contained in the first quantization table,
        means for storing a second multi-element quantization table ($Q_D$) related to but nonidentical to the first quantization table $Q_E$,
        an entropy encoder means for transforming the quantized image data into the encoded image data using an entropy table;
    means for encapsulating the encoded image data, the second quantization table, and the entropy table to form an encapsulated data file; and
    means for transmitting the encapsulated data file.

2. A machine for transmitting color images according to claim 1 further comprising a scaler for scaling the first quantization table ($Q_E$) in accordance with a predetermined function to form the second quantization table ($Q_D$).

3. A machine for transmitting color images according to claim 1 wherein the second quantization table is related to the first quantization table in accordance with a predetermined function of the energy in a reference image and the energy in a scanned image.

4. A machine for transmitting color images according to claim 3 wherein the predetermined function is given by the following expression:

$$Q_D = S \times Q_E,$$

where S is a scaling matrix having each element $S[k,l]$ formed according to the following expression:

$$S[k,l]^2 = V^*[k,l]/V_Y[k,l],$$

where $V^*$ is a variance matrix of the reference image and $V_Y$ is a variance matrix of the scanned image.

5. A machine for transmitting color images according to claim 1 wherein the means for rendering a color image into color source image data representing the color image includes:
    a color scanner;
    means for gamma correcting the color source image data; and
    means for transforming the color source image data from a first color space to a second color space.

6. A machine for transmitting color images according to claim 1 wherein the means for rendering a color image into color source image data representing the color image includes computer software operable on a computer.

7. A machine for transmitting color images according to claim 1 further comprising:

means for receiving an encapsulated data packet;

means for decoding the encapsulated data packet to extract a header, received image data, a received quantization table ($Q_R$), and a received entropy table;

a decompression engine that decompresses the received image data into color source image data using the received quantization table and the received entropy table; and means for reproducing a color image from the color source image data.

8. A machine for transmitting color images according to claim 7 further comprising a scaler for scaling the received quantization table into a scaled quantization table ($Q_S$), which is used by the decompression engine in lieu of the received quantization table.

9. A machine for transmitting color images according to claim 8 wherein the scaled quantization table is related to the received quantization table in accordance with a predetermined function of the energy in a reference image and the energy in a scanned image.

10. A machine for transmitting color images according to claim 9 wherein the predetermined function is given by the following expression:

$$Q_S = S \times Q_R,$$

where S is a scaling matrix having each element $S[k,l]$ formed according to the following expression:

$$S[k,l]^2 = V^*[k,l]/V_Y[k,l],$$

where $V^*$ is a variance matrix of the reference image and $V_Y$ is a variance matrix of the scanned image.

11. A machine for transmitting color images according to claim 10 further comprising means for selectively scaling the received quantization table responsive to the header.

12. A machine for transmitting color images according to claim 7 wherein the means for reproducing a color image from the color source image data includes computer software operable on a computer for displaying the color image on a computer display associated with the computer.

13. A machine for transmitting color images according to claim 1 wherein the transforming means includes means for transforming the source image data into transformed image data using the discrete cosine transform (DCT).

14. A method of compressing and transmitting images which produces decompressed images having improved text and image quality, the method comprising:

compressing a source image into compressed image data using a first quantization table ($Q_E$);

forming a second quantization table ($Q_D$), wherein the second quantization table is related to the first quantization table in accordance with a predetermined function of the energy in a reference image and the energy in a scanned image, such that the second quantization table ($Q_D$) is configured to compensate for image degradation caused by a scanner;

transmitting the compressed image data; and decompressing the compressed image data using the second quantization table $Q_D$.

15. A method of compressing and transmitting images which produces decompressed images having improved text and image quality according to claim 14 wherein the step forming a second quantization table includes scaling the first quantization in accordance with the predetermined function.

16. A method of compressing and transmitting images which produces decompressed images having improved text and image quality, the method comprising:

compressing a source image into compressed image data using a first quantization table ($Q_E$);

forming a second quantization table ($Q_D$), wherein the second quantization table is related to the first quantization table in accordance with a predetermined function of the energy in a reference image and the energy in a scanned image;

transmitting the compressed image data; and decompressing the compressed image data using the second quantization table $Q_D$;

wherein the step of forming a second quantization table includes scaling the first quantization table in accordance with the predetermined function prior to the transmitting step.

17. A method of compressing and transmitting images which produces decompressed images having improved text and image quality according to claim 15 wherein the step scaling the first quantization in accordance with the predetermined function is performed subsequent to the transmitting step.

18. A method of compressing and transmitting images which produces decompressed images having improved text and image quality according to claim 15 wherein the step forming a second quantization table includes forming a second quantization table ($Q_D$), where the second quantization table is related to the first quantization table according to the following expression:

$$Q_D = S \times Q_E,$$

where S is a scaling matrix having each element $S[k,l]$ formed according to the following expression:

$$S[k,l]^2 = V^*[k,l]/V_Y[k,l],$$

where $V^*$ is a variance matrix of the reference image and $V_Y$ is a variance matrix of the scanned image.

19. A method of compressing and transmitting images which produces decompressed images having improved text and image quality, the method comprising:

compressing a source image into compressed image data using a first quantization table ($Q_E$);

forming a second quantization table ($Q_D$), wherein the second quantization table is related to the first quantization table in accordance with a predetermined function of the energy in a reference image and the energy in a scanned image;

transmitting the compressed image data;

decompressing the compressed image data using the second quantization table $Q_D$;

encapsulating the second quantization table $Q_D$ with the compressed image data to form an encapsulated data file; and transmitting the encapsulated data file.

20. A method of compressing and transmitting images having improved text and image quality according to claim 14 wherein the step of forming a second quantization table ($Q_D$) includes:

selecting a target image; and rendering the target image into an image file.

21. A method of compressing and transmitting images having improved text and image quality according to claim 20 wherein the step of selecting a target image includes selecting a target image having critical image elements that are critical to the quality of the image.

22. A method of compressing and transmitting images having improved text and image quality according to claim 20 wherein the step of selecting a target image includes selecting a target image having text.

23. A method of compressing and transmitting images having improved text and image quality according to claim 20 wherein the step of selecting a target image includes selecting a target image having text with a serif font.

24. A method of forming a quantization table for use in compressing images in accordance with the JPEG compression standard, the method comprising:

selecting a first quantization table ($Q_E$); and forming a second quantization table ($Q_D$), where the second quantization table is related to the first quantization table according to the following expression:

$$Q_D = S \times Q_E,$$

where S is a scaling matrix having each element S[k,l] formed according to the following expression:

$$S[k,l]^2 = V^*[k,l]/V_Y[k,l],$$

where $V^*$ is a variance matrix of a reference image and $V_Y$ is a variance matrix of a scanned image.

25. A method of forming a quantization table according to claim 24 wherein the step of forming a second quantization table ($Q_D$) includes:

selecting the reference image;

rendering the reference image into reference image data; and computing the variance matrix $V^*$ for the reference image data.

26. A method of forming a quantization table according to claim 25 wherein the step of forming a second quantization table ($Q_D$) includes:

scanning the scanned image to produce scanned image data; and computing the variance matrix $V_Y$ for the scanned image data.

27. A method of forming a quantization table according to claim 26 wherein the step of scanning the scanned image to produce scanned image data includes scanning the reference image.

28. A method of improving text and image quality of compressed images that are compressed using the JPEG compression standard, the method comprising:

selecting a reference image;

determining the energy content of the reference image;

selecting a scanned image;

determining the energy content of the scanned image;

selecting a first quantization table ($Q_E$);

scaling the first quantization table ($Q_E$) to form a second quantization table ($Q_D$) according to the ratio of the energy in the reference image to the energy content of the scanned image, such that the second quantization table ($Q_D$) is configured to compensate for image degradation caused by a scanner;

compressing a source image in accordance with the JPEG standard using the first quantization table ($Q_E$); and decompressing the source image in accordance with the JPEG standard using the second quantization table $Q_D$ whereby the decompressed image has improved image quality.

29. A method of improving text and image quality according to claim 28 wherein the step of determining the energy content of the reference image includes determining a variance matrix ($V^*$) of the reference image.

30. A method of improving text and image quality according to claim 29 wherein the step of determining the energy content of the scanned image includes determining a variance matrix ($V_Y$) of the scanned image.

31. A method of improving text and image quality according to claim 30 wherein the step of scaling the first quantization table ($Q_E$) to form a second quantization table ($Q_D$) according to the ratio of the energy in the reference image to the energy content of the scanned image includes:

determining a scaling matrix (S), where each element S[k,l] being formed according to the following expression:

$$S[k,l]^2 = V^*[k,l]/V_Y[k,l],$$

where $V^*[k,l]$ is a corresponding element in the variance matrix $V^*$ and $V_Y[k,l]$ is the corresponding element in the variance matrix $V_Y$; and scaling the first quantization table ($Q_E$) to form a second quantization table ($Q_D$) according to the following expression:

$$Q_D = S \times Q_E.$$

32. A method of improving text and image quality of compressed images that are compressed using the JPEG compression standard, the method comprising:

selecting a reference image;

determining the energy content of the reference image;

selecting a scanned image;

determining the energy content of the scanned image;

selecting a first quantization table ($Q_E$);

scaling the first quantization table ($Q_E$) to form a second quantization table ($Q_D$) according to the ratio of the energy in the reference image to the energy content of the scanned image;

compressing a source image in accordance with the JPEG standard using the first quantization table ($Q_E$);

decompressing the source image in accordance with the JPEG standard using the second quantization table $Q_D$ whereby the decompressed image has improved image quality;

encapsulating the second quantization table ($Q_D$) with the compressed image to form a JPEG file; and transmitting the JPEG file over a limited bandwidth channel.

33. A method of improving text and image quality according to claim 28 further comprising:

selecting a plurality of reference images;

determining the energy content of each reference image;

averaging the energy content of the plurality of reference images; and scaling the first quantization table ($Q_E$) to form a second quantization table ($Q_D$) according to the ratio of the average energy in the reference images to the energy content of the scanned image.

34. A method of improving text and image quality according to claim 33 wherein the step of selecting a plurality of reference images includes selecting a plurality of reference images each reference image having a different graphical content.

35. A method of improving text and image quality according to claim 28 further comprising:

selecting a plurality of scanned images;

determining the energy content of each scanned image;

averaging the energy content of the plurality of scanned images; and scaling the first quantization table ($Q_E$) to form a second quantization table ($Q_D$) according to the ratio of the energy in the reference image to the average energy content of the scanned images.

* * * * *